United States Patent [19]
Gregory et al.

[11] Patent Number: 5,381,284
[45] Date of Patent: Jan. 10, 1995

[54] SPACER RING RESERVOIR FOR MAGNETIC RECORDING DISK LUBRICANT

[75] Inventors: Thomas A. Gregory; Christopher G. Keller, both of Rochester, Minn.

[73] Assignee: International Business Machines Corporation, Armonk, N.Y.

[21] Appl. No.: 261,654

[22] Filed: Jun. 17, 1994

Related U.S. Application Data

[63] Continuation of Ser. No. 885,323, May 18, 1992, abandoned.

[51] Int. Cl.⁶ .......................... G11B 17/32; G11B 5/60
[52] U.S. Cl. ................... 360/97.02; 360/97; 360/103
[58] Field of Search ............... 360/97.01, 97.02, 97.03, 360/102, 103

[56] References Cited

U.S. PATENT DOCUMENTS

| | | | |
|---|---|---|---|
| 4,626,941 | 12/1986 | Sawada et al. | 360/97 |
| 4,789,913 | 12/1988 | Gregory et al. | 360/97 |
| 4,873,594 | 10/1989 | Chen | 360/97.03 |
| 5,060,095 | 10/1991 | Rigotti et al. | 360/98.01 |
| 5,097,368 | 3/1992 | Lemke et al. | 360/97.02 |
| 5,112,662 | 5/1992 | Ng | 428/64 |
| 5,138,506 | 8/1992 | Beck et al. | 360/97.02 |
| 5,193,046 | 3/1993 | Lemke et al. | 360/97.02 |
| 5,198,934 | 3/1993 | Kubo et al. | 360/104 |
| 5,202,803 | 4/1993 | Albrecht et al. | 360/97.02 |

FOREIGN PATENT DOCUMENTS

| | | |
|---|---|---|
| 0127444 | 12/1984 | European Pat. Off. . |
| 0367510 | 5/1990 | European Pat. Off. . |
| 57-167179 | 10/1982 | Japan . |
| 57-179977 | 11/1982 | Japan . |
| 59-218668 | 12/1984 | Japan . |
| 59-221873 | 12/1984 | Japan . |
| 60-182573 | 9/1985 | Japan . |
| 63-206952 | 8/1988 | Japan . |
| 4155682 | 5/1992 | Japan . |

*Primary Examiner*—Stuart S. Levy
*Assistant Examiner*—Paul J. Ditmyer
*Attorney, Agent, or Firm*—Richard E. Billion; Roy W. Truelson

[57] ABSTRACT

A lubricant reservoir system for a magnetic disk near contact data storage device, which rotates in unison with the disk assembly to replace lubricant depleted from the disk surface over the life of the device, includes reservoir chambers in disk spacers with lubricant metering provided by restricted passages or textured surfaces extending radially outward from the reservoir chamber while replacement air passages extend radially inward to replace dispensed lubricant. The metered lubricant is delivered to the disk surface at a location where the surface confronting the disk is made compliant with the disk surface and the adjoining surface is beveled to form an angle of more than 90 degrees with the disk surface thereby preventing migration of lubricant away from the disk. Nonwettable surfaces may be used in metering passages, air passages, and on some beveled surfaces to further control lubricant metering. In operation, the high G forces induced by rotation cause lubricant to be metered to the disk while the same small metering passages function as a barrier when the disk assembly is not rotating.

23 Claims, 6 Drawing Sheets

SPACER RING RESERVOIR FOR MAGNETIC RECORDING DISK LUBRICANT

This is a continuation of application Ser. No. 07/885,323, filed May 18, 1992, now abandoned.

FIELD OF THE INVENTION

The invention is in the field of near contact magnetic recording disk drives that use a thin layer or film of lubricant to separate the slider from the rotating disk surface. Means are provided to maintain this lubricant film for the life of the device by metering it out from a spacer ring reservoir at a rate equal to the rate of loss from the rotating disk surface occasioned by centrifugal force during device operation.

BACKGROUND

As magnetic storage densities of disk drives increase it is necessary that the magnetic recording layer of the storage media becomes thinner and that the separation between the magnetic recording layer and the transducer during relative motion becomes less. It will soon be necessary to maintain a separation of one microinch or less between the spinning disk media and the transducer without permitting head to disk or solid to solid contact that would quickly precipitate wear-out. One method for doing this is to maintain a thin layer of lubricant (in the range of 5 to 500 angstroms) on the disk surface with a thickness sufficient to prevent head to disk contact, but thin enough to ensure close spacing between head and disk. For this system, the disk is lubed (generally by dip or spin application) prior to assembly of the device. The lubricant is sufficiently viscous to assure that it is spun off the disk very slowly during drive operation. However, there is no lubricant that will last for the desired life of the device given only a one-time application. Therefore, some system for the replenishment of the film of lubricant at the disk surface is required.

To obtain successful and satisfactory replenishment of the disk recording surface lubricant film it is necessary that several objectives be met. The stored lubricant must be metered out at a rate within the desired range under all operating conditions to which the disk drive can be expected to be exposed. All of the lubricant that flows out of or is released from the reservoir must flow to the disk surface. This is to assure effective use of the stored lubricant and prevent waste that would be occasioned by droplets of lubricant that might be released from the reservoir without application to the disk surface. Further the circumferential distribution of the lubricant must be uniform and lubricant flow must be effectively zero when the device is not spinning.

SUMMARY OF THE INVENTION

The invention is practiced using a spacer ring located adjacent the inner diameter of the recording disk surface and radially within the band of tracks used for recording data or other information. The reservoir must contain an adequate internal volume to store the quantity of lubricant needed to replenish the lubricant film on the disk surface which it contacts for the life of the disk drive. The reservoir-spacer structure includes a plurality of annular regions that provide the rigidity needed for proper disk spacing in the drive; afford a reservoir volume in which the lubricant is stored and a metering structure through which lubricant is released in a controlled manner. There is an annular surface over which precise compliance with the disk surface is established. The annular compliant surface of the spacer ring extends beyond the radius at which normal manufacturing defects are allowed at the surface of the disk. The radius of the spacer ring has a local maximum diameter at the disk surface to confine lubricant released from the reservoir to the disk surface. An opening is provided at the inner diameter of the ring to allow the atmosphere exterior of the spacer ring to communicate with the reservoir region.

The use of an annular reservoir that rotates and dispenses liquid lubricant from the outer diameter of the reservoir provides a high G force during operation that induces dispensing of lubricant at a low rate during the life of the device and a non-operating condition wherein the small metering passageways effectively seal the lubricant in the reservoir. In addition, the fact that the G force increases as the radius increases causes the delivery of lubricant from the reservoir to be substantially uniform throughout the life of the product.

A porous, absorbent material disposed in the reservoir is an option to enhance containment. Although such materials will diminish the volume of the reservoir, capillary effects will absolutely prevent leakage of fluid lubricant when the drive is not operational. During operation, centrifugal force will cause the lubricant to quickly migrate to the volume contiguous with the maximum internal diameter of the reservoir, whereupon metered flow occurs as already described. When rotation ceases, capillary containment of the lubricant is re-established. The optional use of an absorbent material becomes especially important in the regime of: 1) a high metering rate; 2) use of a low viscosity lubricant; 3) use of a low centrifugal field (i.e., low RPM and/or small radius used for metered flow).

DETAILED DESCRIPTION

Figure 1:
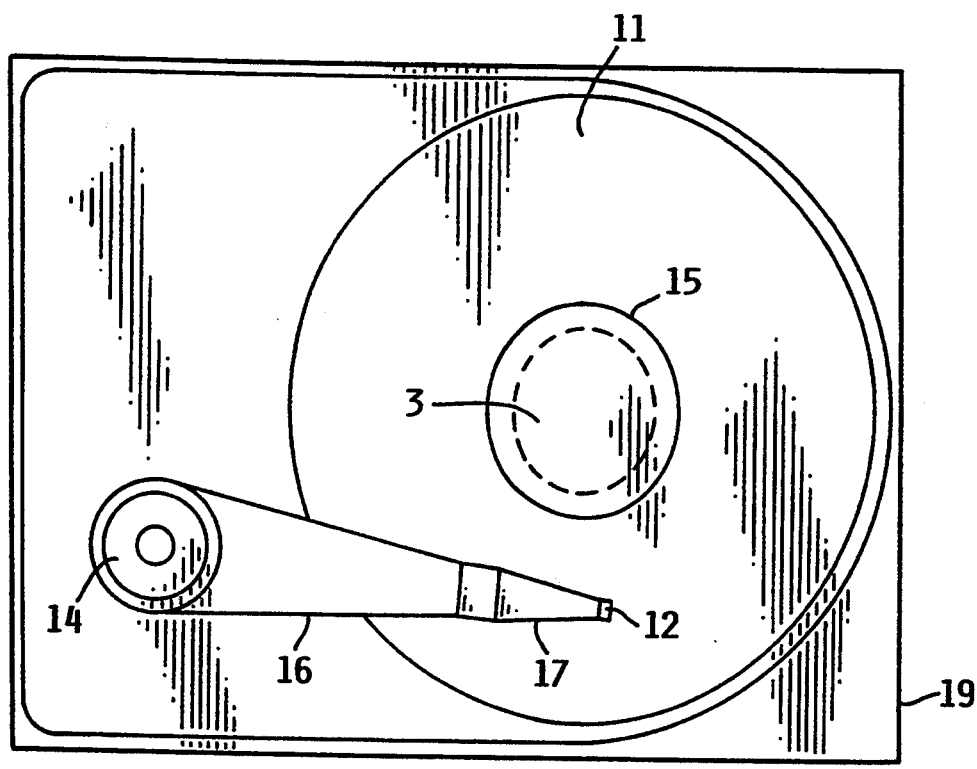
FIG. 1 is a schematic partial plan view of a typical disk drive with the cover removed.
Figure 2:
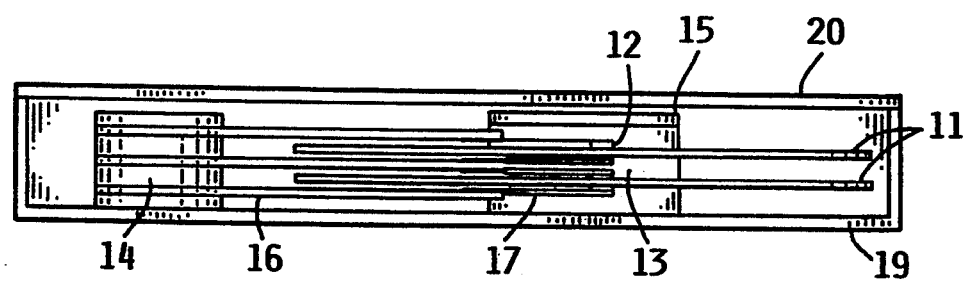
FIG. 2 is a side elevation of the disk drive of FIG. 1, partly broken away.

FIGS. 1 and 2 illustrate a typical rigid disk data storage device. Data is stored on a plurality of rigid disks 11 that are clamped together in an assembly that rotates about an axis 3. The disk stack assembly includes the magnetic disks 11 supported on a hub 3 separated by spacers 13 and retained by a clamping member 15 to enable the entire assembly to be rotated in unison.

The typical actuator assembly 14 has a series of rigid arms 16 each of which carries a flexure 17 that supports a transducer carrying head 12. The transducers respectively confront the data surfaces of the disks to write data onto and read data from concentric tracks in the magnetic recording layer at the disk surface. The actuator assembly 14 is most commonly rotated about an axis by a voice coil motor (not shown) to move the transducers from one concentric track to another concentric track. A more detailed showing of such a typical voice coil motor drive rotary actuator can be found in U.S. Pat. No. 5,060,095. The spindle and actuator assemblies are supported within an enclosure, formed of a base member 19 and cover 20, that substantially seal the head disk assembly from the surrounding atmosphere. The drive unit is either hermetically sealed or provided with a breather filter to assure that air entering the enclosure is free of airborne contaminants.

The drive environment to which the present invention is applicable is a near contact disk drive wherein the transducer is separated from the media surface by a film of liquid lubricant and more particularly by a film of high viscosity lubricant that is replenished during the life of the disk drive. The liquid lubricant is a high viscosity lubricant for rigid disks which may be either a perfluorinated or hydrocarbon lubricant with a bulk viscosity of about 1 centipoise or greater.

Figure 3:
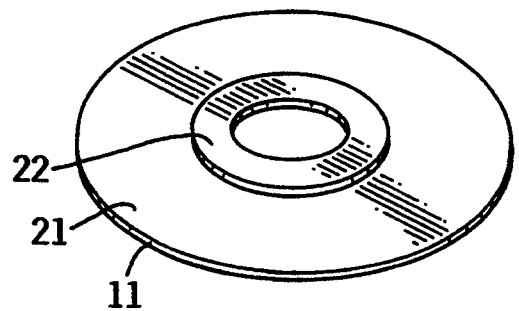
FIG. 3 shows a typical disk and spacer for a disk drive.

FIG. 3 schematically shows a spacer ring 22 that separates confronting disk surfaces 21 and adjoins each recording surface upon which a lubricant film is to be maintained.

Figure 4:
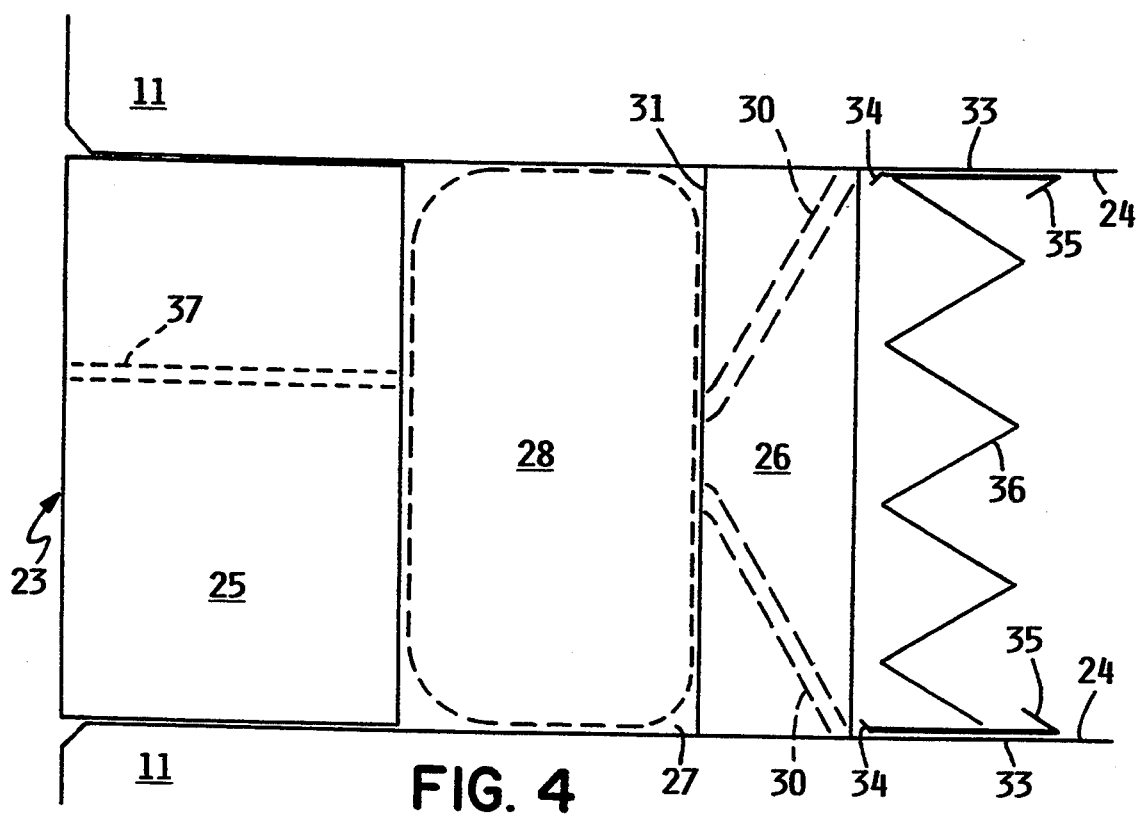
FIG. 4 is a disk spacer sectional view which schematically illustrates the present invention.

FIG. 4 illustrates one embodiment of the present invention. The disks 11 are separated by spacer assemblies 23 that also provide a lubricant reservoir function by which the confronting disk surfaces 24 are supplied with lubricant to replace that depleted by disk rotation. The spacer portions 25 are rigid and perform the function of maintaining a fixed distance of separation between adjoining disk surfaces 24. Whatever other function the disk spacer may perform, the spacer must serve the primary purpose of accurately maintaining spacing and parallelism between adjoining disk surfaces. The annuluses 25, 26 may be separate parts or may be a single part with connecting radial ribs or other elements which would simplify assembly of the disk stack. The intermediate annular space 27 contains a porous material 28 that is almost saturated with lubricant to form the reservoir. Using a porous solid retainer or an absorbent sponge like material is the mode that affords the greatest ease of handling and assembly. However, retaining the lubricant within a membrane that permits passage of the liquid would be the technique that enables most effective use of the storage volume. The passages 30 which extend from the cylindrical outer annular wall surface of the annular reservoir volume to an outlet adjacent the respective disk surface 24 have either a diameter or a restriction that performs the metering function to release the lubricant to the disk surface at a predetermined rate. The passages 30 are numerous about the periphery to enable a uniform delivery of liquid lubricant to the disk surface. The compliant washer 33 has a radially inward margin 34 turned to capture lubricant discharged from the passages between washer 33 and the adjoining disk surface 24. One or both of the adjoining surface portions of the washer and disk are sufficiently irregular to permit passage of the lubricant therebetween. The disk irregularity may be the disk texture if the texturing grooves have a radial component. The radially outward margin 35 of washer 33 is turned to form an angle of greater than 90 degrees. This causes any lubricant droplets or globules to be released at the surface of the disk and not be either wasted by being flung toward the enclosure surface or actually being a hazard. A compressible like annular biasing member 36, shown schematically as a bellows like biasing member, is provided to urge the compliant washers toward the adjoining disk surfaces. An air passage 37 allows air to access the annular reservoir space 27 to neutralize pressure differences between the interior lubricant chamber and the ambient environment. This accommodates temperature changes and enables air to replace lubricant delivered to the disk surface.

When the drive is not operating and the disk assembly is not rotating, the assembly is subject to only the ambient atmosphere. Under such conditions the clearance between the spacer and the adjacent disk is not sufficient to permit the lubricant to significantly escape, nor does the small size of the metering passageways 30 permit lubricant to pass from the reservoir 27 with any consequence. When the drive is operating and the spindle assembly is rotating at a typical operating speed of 4000 RPM, the centrifugal force which drives the lubricant through the metering passages 30 at a radius of 18 millimeters is 725 Gs. Thus, the requirement that lubricant not be delivered during non-operating periods is achieved.

Figure 5A:
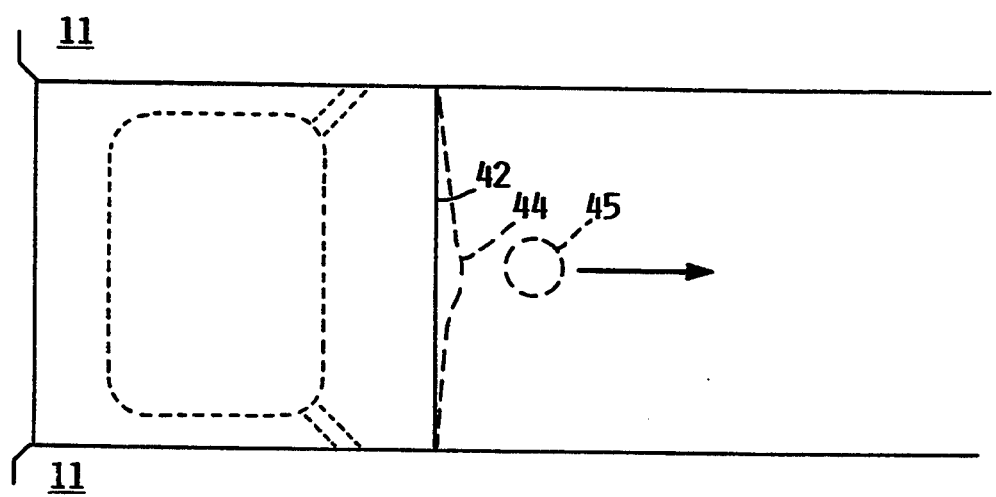
FIG. 5A is a disk spacer section view illustrating the tendency of lubricant to travel along a cylindrical surface.
Figure 5B:
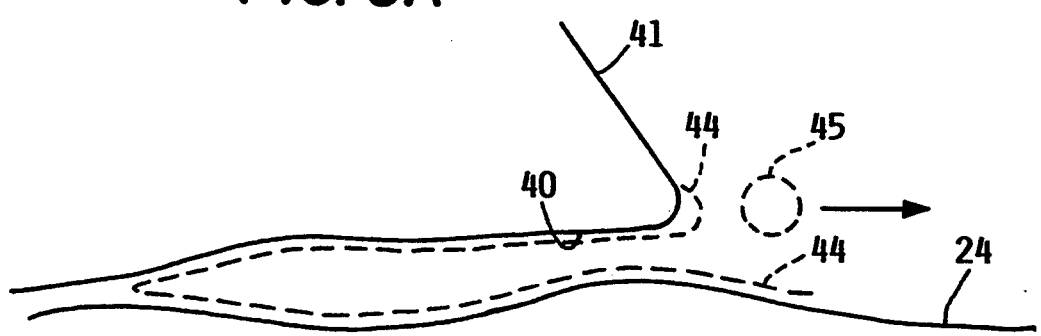
FIG. 5B is an enlarged sectional view of disk and spacer portions illustrating lubricant travel with respect to noncompliant surfaces.

If, as in FIG. 5A, the wall 42 at the outside diameter of the spacer ring is cylindrical rather than beveled, a portion of the lubricant 44 creeps away from the disk as indicated by the dashed line and is flung off as droplets 45 into the air. Another undesirable condition is shown in FIG. 5B where the spacer is non-compliant giving rise to separate lubricant films 44 on both the disk surface 24 and the disk spacer surface 40 as shown by the dashed lines. The lower film follows the disk surface, but the upper film, following the non-compliant spacer surface collects at the apex of the spacer surface and the beveled surface 41 and is thrown off into the air as droplets 45.

Figure 6A:
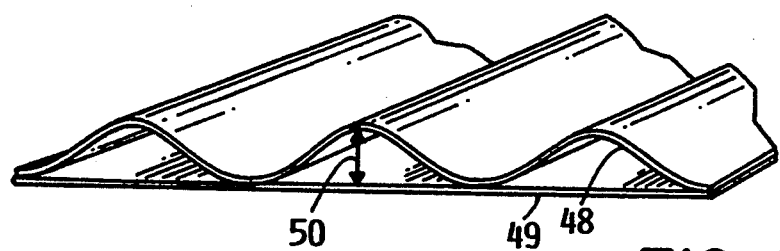
FIG. 6A shows an enlarged view of a textured spacer surface confronting a polished disk surface.
Figure 6B:
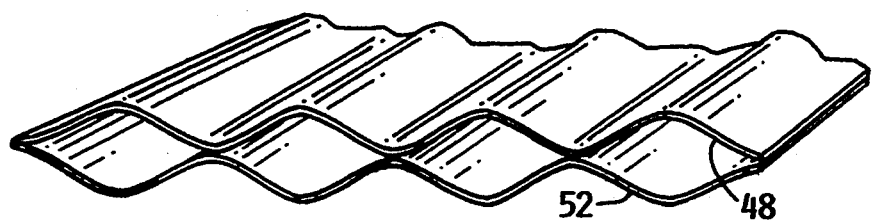
FIG. 6B shows two confronting textured surfaces.

FIG. 6A shows a textured surface 48 mated with a flat polished surface 49 wherein textured grooves or recesses having a depth 50 of 0.1 to 3 microns provide the passages that meter the lubricant. FIG. 6B illustrates the use of two textured mating surfaces 48, 52 which provide greater metering capability if the same texture depth is applied to the second surface. To be effective the texture grooves must have a radial component. The preferred structure is a cross hatch texture pattern formed as a series of discontinuous controlled depth grooves that form angles with one another of from a few degrees to about 45 degrees.

Figure 7:
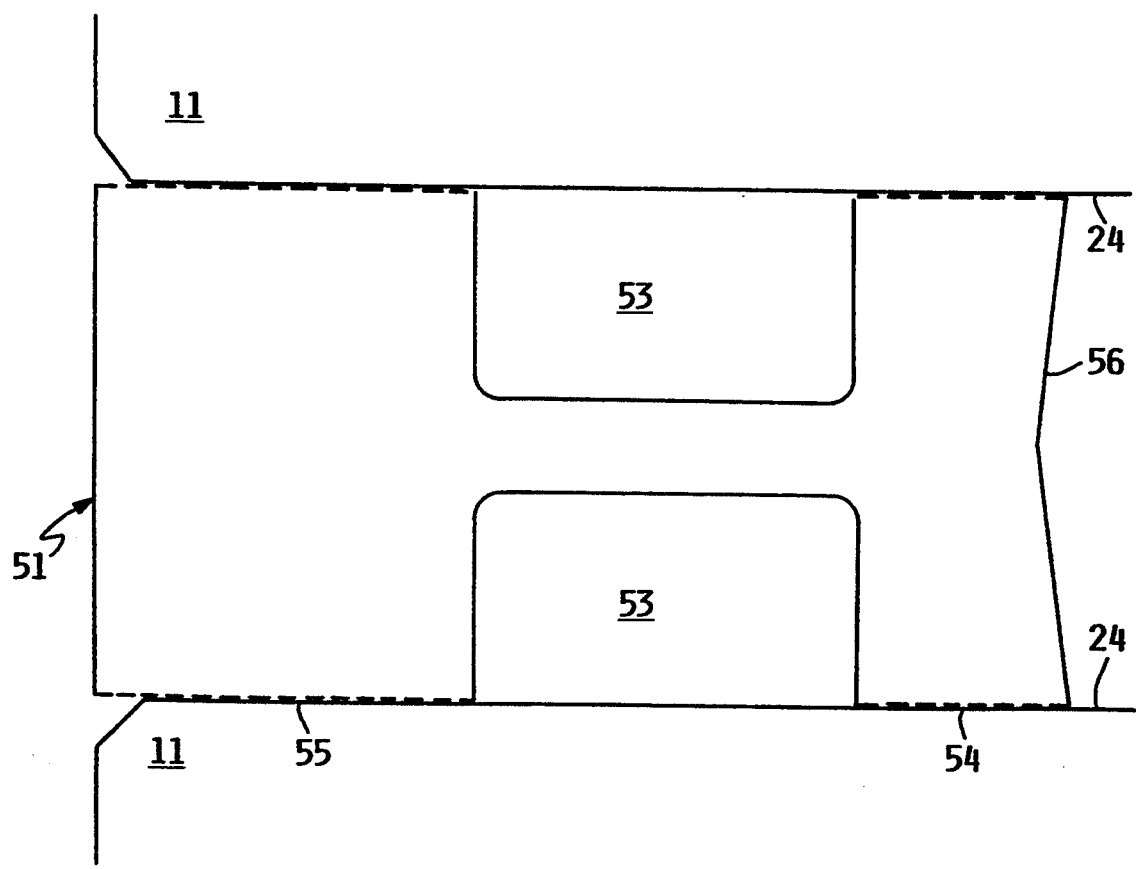
FIGS. 7, 8, 9, 10, 11, 12, and 13 are disk spacer sectional views that illustrate respective embodiments of the present invention that are applicable to varying environments.

In the embodiment of FIG. 7, a pair of rigid disks 11 are separated by a spacer 51. Spacer 51 is rigid and includes lubricant reservoir portions 53 which may be separate or interconnected annular recesses. The reservoir may be occupied by a porous absorbent material which is almost saturated with the liquid lubricant to cause the lubricant to be gradually released to the confronting disk surfaces 24 over the life of the disk drive unit.

The surfaces radially inward and radially outward from the reservoir portion are provided with a controlled roughness. The roughened surface 54 radially outward from the reservoir provides the lubricant metering interface while the roughened surface 55 radially inward from the reservoir recess 53 enables air to enter the reservoir to replace lubricant metered to the disk surface. The surface roughness of both the metering interface 54 and the air access surfaces 55 is sufficiently small to prevent the passage of liquid lubricant or air when the disk assembly is not rotating. When the drive is operating with the disk assembly rotating, the centrifugal force can typically be 700 Gs at a radius of 18 millimeters when a 3½ inch diameter disk drive is rotating at 4000 revolutions per minute.

The spacer peripheral surface 56 is formed with a smaller radius at the axial midpoint such that the frusto conical surfaces form an angle of greater than 90 degrees with the disk surfaces 24. This avoids the problem described with respect to FIG. 5A wherein the lubricant travels along a cylindrical surface, rather than collecting at the edge adjoining the disk surface to be released at the disk surface as a surface film. With a disk polished surface finish, the spacer is sufficiently compliant with the roughened mating surface to prevent droplets from being expelled to the atmosphere rather than being released as a part of the disk surface lubricant film. This embodiment is most useful with disks that are sufficiently planar to require little flexibility in the system to achieve compliance.

Figure 8:
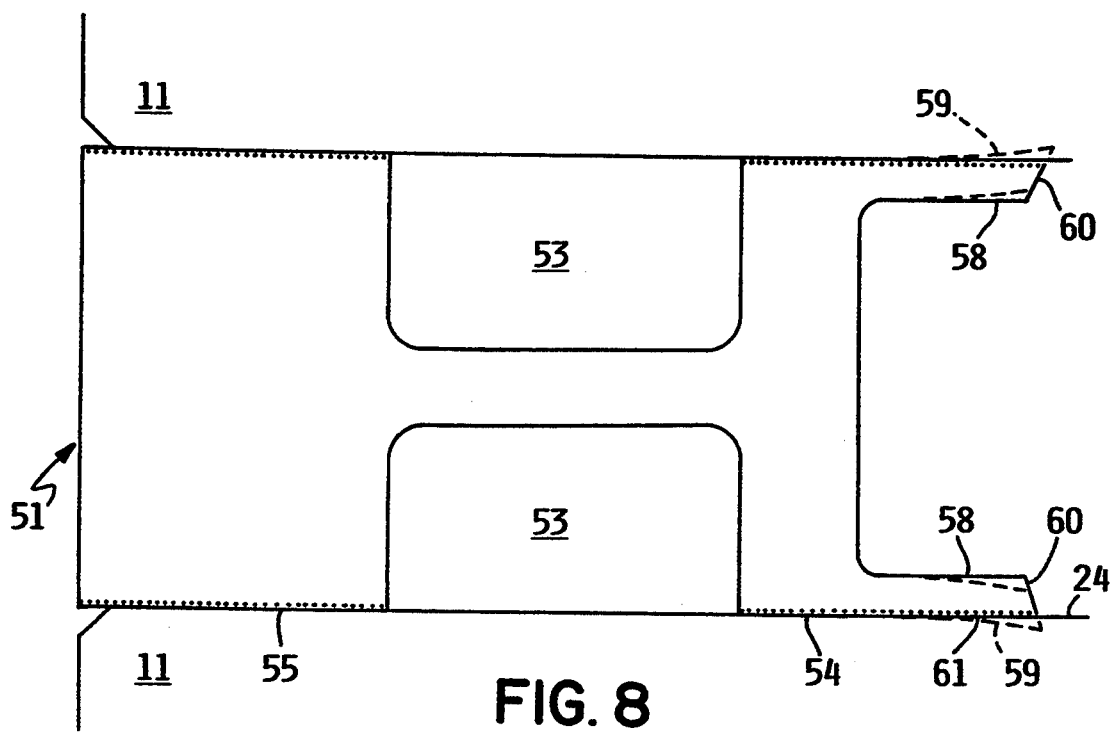

The embodiment of FIG. 8 is similar to that of FIG. 7, but uses a spacer 51 wherein the flange portions 58 at the outer diameter are formed to axially diverge, prior to assembly in the disk stack, as illustrated in exaggerated form by the dashed line portions 59. The flanges 59 are forced to a substantially radial condition, as shown by the solid line structure 58, when the stack of disks is assembled and clamped together to bring the textured metering interface surfaces into a close solid-to-solid compliance with the abutting disks. The textured surfaces 54, 55 at the axial ends of the spacer afford the lubricant metering functions and the axial air replacement path for the replacement of lubricant dispensed from the reservoir respectively.

Figure 9:
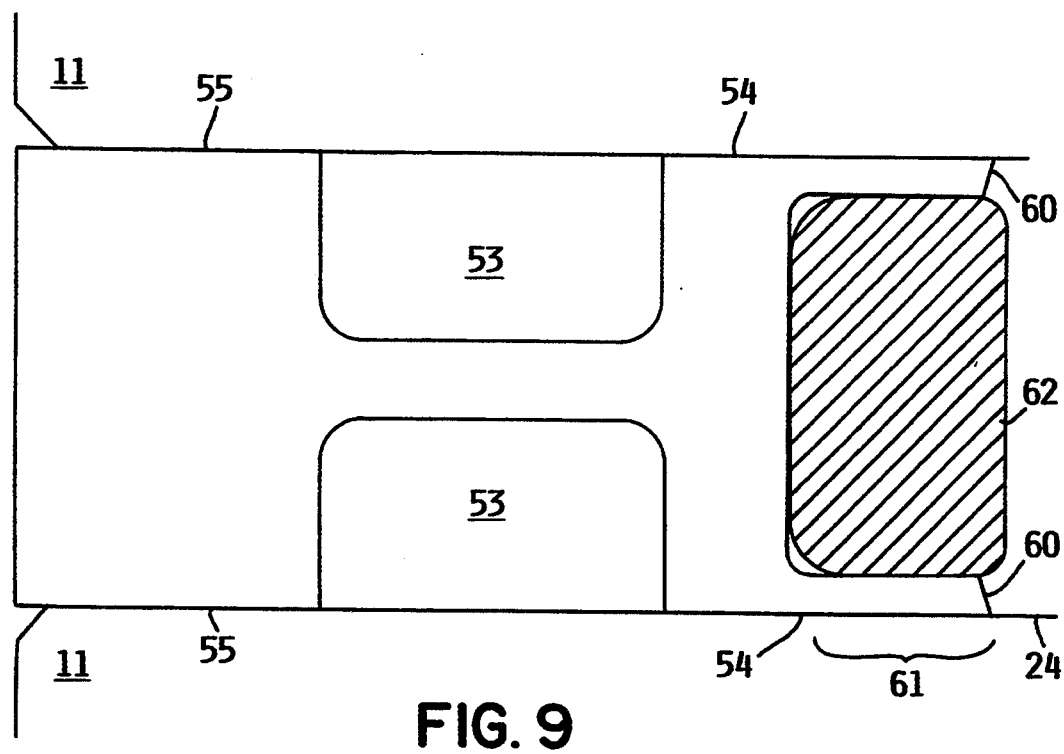

FIG. 9 shows an embodiment similar to that of FIG. 8 wherein a compressed high stiffness elastomer ring 62 is used to press the flange compliant surfaces 61 into intimate contact with the abutting disk surface 24. If the elastomer ring lacks sufficient stiffness, the high G forces exerted during rotation will induce radial expansion which results in an inadequate axial force. This causes a failure in the ability of the ring to bias the flanges into compliance with the disk surface. In the embodiments of both FIGS. 8 and 9 the flange end surfaces 60 are beveled to form a frusto conical surface adjoining the disk surface 24 such that the two surfaces present an angle of more than 90 degrees. This beveled surface prevents the metered lubricant from following the surface 60 away from the disk surface. The embodiments of FIGS. 8 and 9 are most useful where the disk surfaces are free of defects such as pits or scratches to permit use as a metering interface, but waviness and curvature are of sufficient magnitude to require a compliant zone in the spacer.

Figure 10:
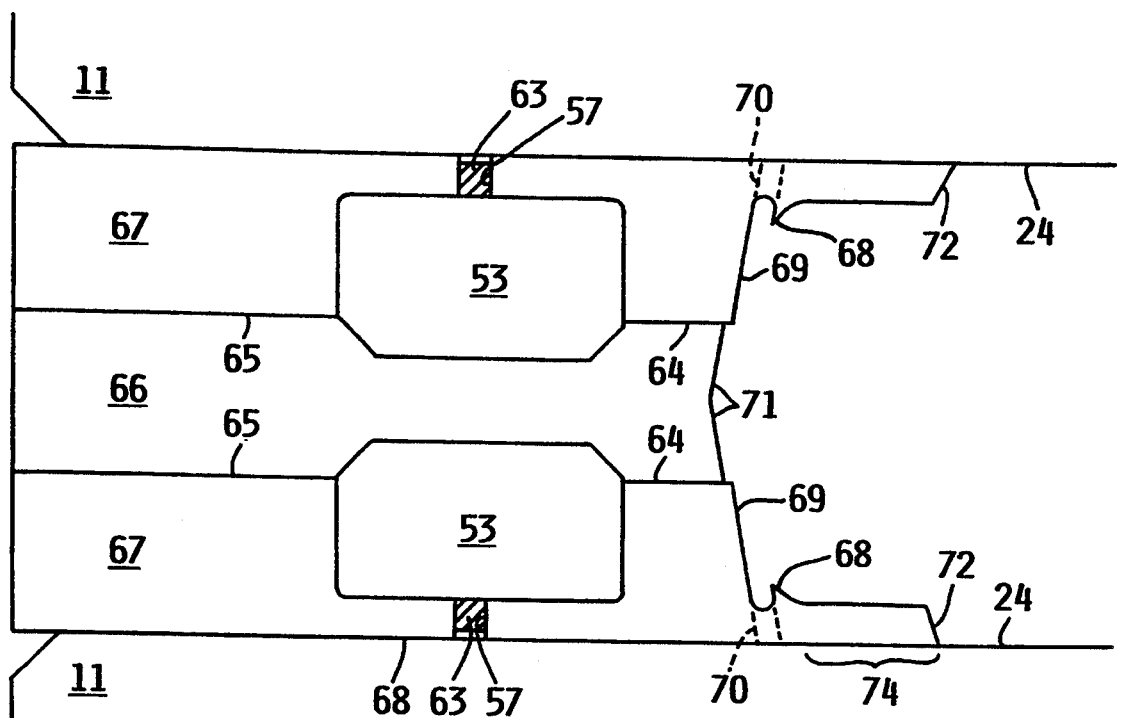

The embodiment of FIG. 10 utilizes a three piece spacer between confronting surfaces 24 of adjoining disks 11. The reservoirs contain the lubricant which is normally retained in an annular ring of porous material. The roughened interfaces 64, 65 between the central annular spacer part 66 and the outer annular spacer parts 67 function to meter the lubricant from reservoir 53 to the annular surfaces 69 and to permit air from adjacent the inner diameter to enter the reservoir to replace dispensed lubricant. The metering interfaces 64 terminate at a radius slightly less than the radius of the frusto conical surfaces 69. The centrifugal force exerted by the rotating disk assembly causes the lubricant to follow the surface 69 from which it is confined by the dike 68 to enter the lubricant drain passages 70 which carry the lubricant to the disk surface 24. The bevel 69 assures that the lubricant is directed to the drain passages. The flange portions provide the surface that forms the compliant zone, being formed to slightly diverge, as in the embodiment of FIG. 8, to bring the flange surfaces closely against the abutting disk surfaces as the disk stack is assembled and clamped together. The roughness of the compliant surface is sufficient to provide a passage less restrictive than the metering interface to assure that the control of lubricant application from reservoir to disk occurs at such metering interface. The surfaces at which the lubricant is released to the disk surface are beveled to create a greater than 90 degree angle, which assures that the lubricant will be released to the disk surface as a part of a film rather than travel away from the disk surface along the spacer outer diameter surface.

Figure 11:
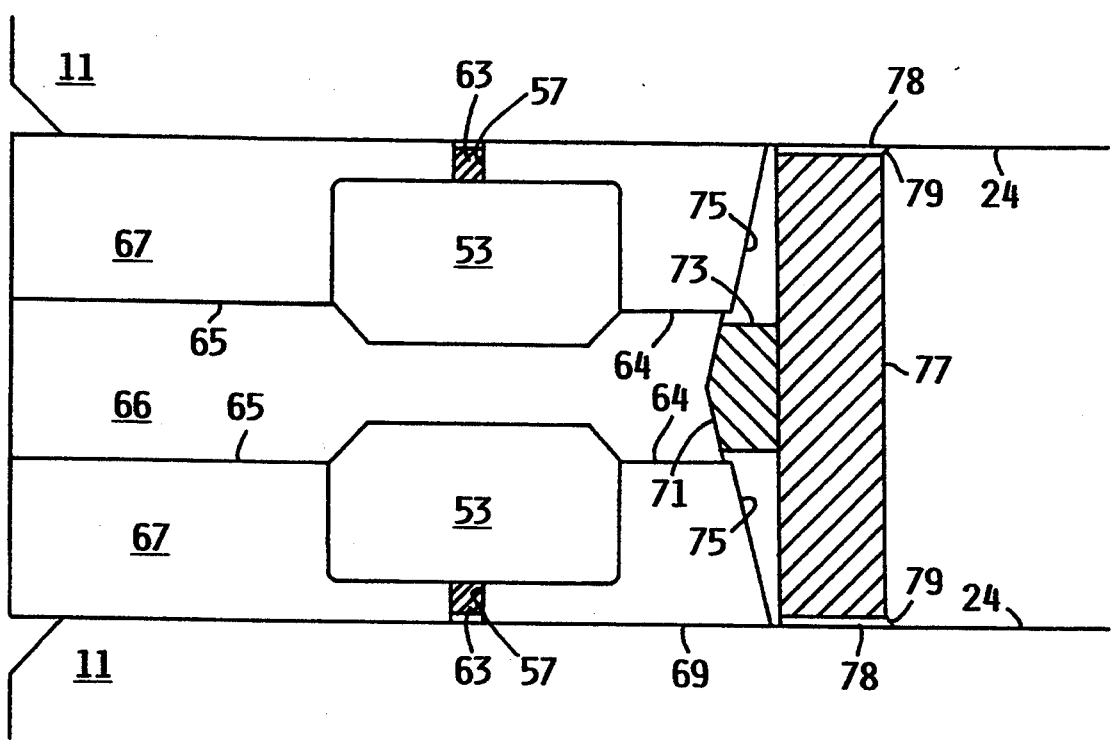

The embodiment of FIG. 11 like that of FIG. 10 includes a three piece spacer structure with lubricant metering interfaces 64 and replacement air interfaces 65. The metered lubricant moves along the conical surfaces 75 at the spacer outer diameter to the respective disk surface 24. An elastomer band 73 surrounds spacer central member 66 and resilient ring 77 includes metal facings 78 abutting the surfaces 24 of the confronting disks provides roughened compliant metal to disk interface surfaces that permit the metered lubricant to move along the disk surface and be released as a film on the disk surface at the outer diameter of the beveled surfaces 79. Resilient ring 77 may be formed of elastomer plastic or soft metal and is slightly oversize in the axial direction and sufficiently compressible to retain the metal facings 78 in compliance with the disk surface without compromising the texture or roughness that provides a passage for the metered lubricant. The structures of FIGS. 10 and 11 can be used in devices where the disks have sufficiently irregular surfaces to preclude their use as a part of the metering interface.

Figure 12:
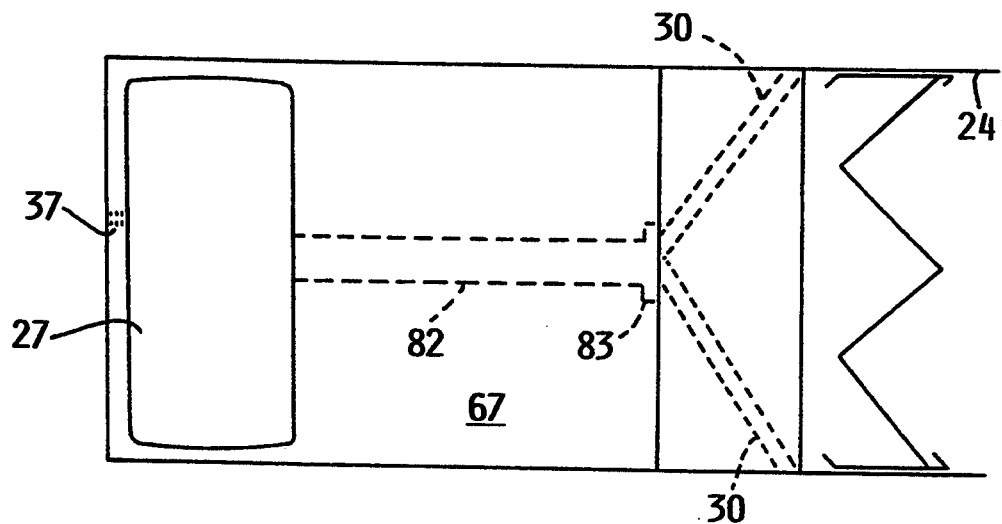
Figure 13:
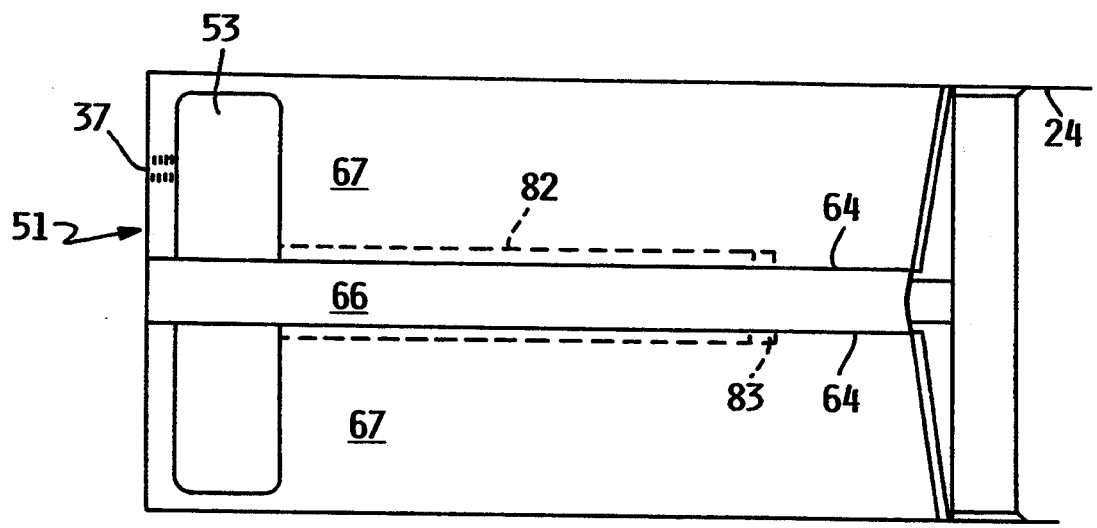

FIGS. 12 and 13 illustrate spacer rings which place the reservoir section 27, 53 at a smaller radius than the rigid section of the ring 67. Lubricant flows from the reservoir through tubular passageways 82, to an annular plenum 83. From the plenum, the lubricant enters the metering interface 30, 64. This arrangement provides a more constant fluid pressure at the metering interface over the life of the device.

Each of the embodiments of FIGS. 7 through 13 illustrate the structure of a spacer intermediate confronting disk surfaces. At each axial end of a disk stack or at each side of a single disk drive provision must be made to dispense lubricant to a single surface. At one end the supporting hub structure and at the opposite end a modified spacer or clamping element is formed to include an axial half of the respective spacer design used between disks.

The reservoirs of the various embodiments 7 through 13 are filled prior to the assembly of the reservoir assemblies, such as the spacers illustrated, into the disk/spindle assembly. The reservoir chambers of the embodiments of FIGS. 7, 8, and 9 may be filled by inserting an absorbent matrix into the reservoir cavities that contains the desired quantity of lubricant. In the embodiments of FIGS. 10 and 11, a pluggable fill hole 57 is provided through which the lubricant can be injected into the reservoir cavity 57 after assembly of the spacer portions 66 and 67. After filling the reservoir, the fill hole 57 is filled with an ultraviolet curing epoxy resin 63 which is applied in a manner that will preclude the projection of the cured epoxy material above spacer surface 68.

To further enhance the operation of the spacer reservoir system, the metering passages or surfaces and the beveled surfaces of the spacer may include a thin nonwettable coating to further resist the passage of lubricant when the disk spindle assembly is not rotating. The nonwettable coating is also applied to the beveled surfaces that resist movement of lubricant away from the disk surface at the outlet of the metering or compliant surfaces. The nonwetting material is applied as a 5–30 angstrom layer, which is heated to bond the coating to the surface. This coating will resist passage of lubricant when the assembly is not subjected to the rotation induced elevated G forces and permit the lubricant surface tension to retain the lubricant in the reservoir. These coatings will be selected based upon which of the two types of lubricant (perfluorinated or hydrocarbon) are to be used in the assembly. The surfaces to which such treatment would be applied are passages 30, 33, and 37 of FIG. 4; surfaces 54, 55, 56 and 60 of FIGS. 7, 8, and 9; and surfaces 64, 65, 71, 72, and 79 of FIGS. 10 and 11.

In operation, when the disk drive is not operating and the disk assembly is not rotating, the metering passages or interfaces are too restricted to permit significant lubricant flow and thus the reservoir is effectively sealed or isolated from the surrounding atmosphere. When the spindle assembly is rotated, high G forces are established which drive the lubricant through the metering passages or interfaces to replenish the lubricant film on the disk surfaces over the life of the device. The metering interfaces or passages are formed with dimensions to effect such long term delivery and to accommodate the viscosity characteristics of the chosen lubricant while doing so. Since the lubricant is metered from the outer diameter of the annular reservoir and the G force induced by rotation increases as the radius increases, the rate of lubricant delivery remains within an acceptable range for the disk surface with respect to either a full reservoir when the device is new or a reservoir that has been substantially depleted during the expected life of the product. The selection of a spacer design from among the embodiments shown is dictated principally by the surface quality of the disks with which the invention is used. Fundamentally, the better the disk surface quality, the simpler the spacer design that may be used. In any of the designs, the spacer side wall can be treated with a low surface energy coating such as a fluoropolymer to preclude the creeping of lubricant away from the disk surface.

While the invention has been particularly shown and described with reference to preferred embodiments thereof, it will be understood by those skilled in the art that various other changes in form and details may be made therein without departing from the spirit and scope of the invention.

What is claimed is:

1. A magnetic disk data storage device comprising:
    a disk assembly including at least one magnetic data storage disk with an inner diameter and an outer diameter including a liquid lubricant film overlying a disk data storage surface, said disk having a plurality of data storage tracks for recording data on said data storage surface;
    a lubricant reservoir system adjacent the disk inner diameter and radially inward of the data storage tracks on said data storage surface;
    said reservoir system including a lubricant reservoir and a metering means for releasing lubricant from said reservoir during device operation at a rate substantially equal to a rate of lubricant film depletion caused by disk rotation, said metering means being located radially outward from said lubricant reservoir and comprising a compliant element urged against the disk surface, wherein metering is provided by surface irregularities in at least one of the confronting surfaces of said disk and said compliant element; and
    means for delivering lubricant metered from said reservoir to the disk data storage surface.

2. The magnetic disk data storage device of claim 1 wherein said reservoir system is formed as a part of a disk spacer assembly.

3. The magnetic disk data storage device of claim 1 wherein said surface irregularities comprise disk surface texturing with longitudinal depressions forming the textured surface having a radial component.

4. The magnetic disk data storage device of claim 1 wherein said compliant element includes an annular compliant surface.

5. The magnetic disk data storage device of claim 4 wherein said compliant element is a metal ring and further comprising biasing means urging the compliant metal surface against the confronting surface of the disk.

6. A magnetic disk data storage device comprising:
    a disk assembly including at least one magnetic data storage disk with an inner diameter and an outer diameter including a liquid lubricant film overlying a disk data storage surface, said disk having a plurality of data storage tracks for recording data on said data storage surface;
    a lubricant reservoir system adjacent the disk inner diameter and radially inward of the data storage tracks on said data storage surface;
    said reservoir system including a lubricant reservoir and a metering means for releasing lubricant from said reservoir during device operation at a rate substantially equal to a rate of lubricant film depletion caused by disk rotation, said metering means being located radially outward from said lubricant reservoir, said metering means comprising at least one spacer ring having a surface abutting a portion of the surface of said disk, at least one of said disk surface and said spacer ring surface abutting the disk surface having controlled roughness to form metering passages between said disk surface and the surface of the spacer ring abutting the disk surface; and
    means for delivering lubricant metered from said reservoir to the disk data storage surface.

7. A magnetic disk data storage device comprising:
    a disk assembly including at least one magnetic data storage disk with an inner diameter and an outer diameter including a liquid lubricant film overlying a disk data storage surface, said disk having a plurality of data storage tracks for recording data on said data storage surface;
    a lubricant reservoir system adjacent the disk inner diameter and radially inward of the data storage tracks on said data storage surface;

said reservoir system including a lubricant reservoir and a metering means for releasing lubricant from said reservoir during device operation at a rate substantially equal to a rate of lubricant film depletion caused by disk rotation, said metering means being located radially outward from said lubricant reservoir, wherein said lubricant reservoir system is foraged of a plurality of parts and said metering means comprises abutting surfaces of said plurality of parts, said abutting surfaces including a controlled roughness and extending radially outward from the lubricant reservoir;

means for delivering lubricant metered from said reservoir to the disk data storage surface; and a compliant member that is biased to compliance with the surface of said disk at a radially outward edge of said compliant member and provides a lubricant passage that is less restrictive than said metering means.

8. The magnetic disk data storage device of claim 7 further comprising a dike positioned to direct lubricant released from said metering means to said lubricant passage provided by said compliant member.

9. A magnetic disk data storage device comprising:

a disk assembly including at least one magnetic disk with an inner diameter and an outer diameter and including a lubricant film on the recording surface that has a viscosity greater than one centipoise, said disk having a plurality of data storage tracks for recording data on the recording surface;

a lubricant reservoir that forms a part of the disk assembly is positioned radially inward of the data storage tracks on a confronting surface of said disk, rotates in unison with said disk assembly, and contains a supply of said lubricant; and metering means for effecting the controlled release of lubricant from said reservoir to supplement said lubricant film and replace lubricant depleted from said film by disk assembly rotation, said metering means comprising passage means extending from the outer diameter of said lubricant reservoir to a disk surface adjacent an outer diameter of said metering means, wherein said metering means presents a compliant annular interface surface radially extending from said lubricant reservoir and metering is provided by a controlled roughness of at least one confronting surface of said disk and said annular interface.

10. The magnetic disk data storage device of claim 9 further comprising a disk spacer adjoining an inner diameter of the confronting surface of said disk and wherein said lubricant reservoir is formed as an annular space in said spacer.

11. The magnetic disk data storage device of claim 10 wherein said disk spacer is formed as a disk spacer assembly of multiple parts that form an annular lubricant reservoir cavity and includes a spacer interface between disk spacer assembly parts that extend from the outer diameter of the annular lubricant reservoir to an outer peripheral surface of said disk spacer, said metering means being effected by the controlled roughness of the spacer interface surface.

12. The magnetic disk data storage device of claim 11 wherein the outer peripheral surface of said disk spacer assembly includes a beveled surface extending from an outer termination of said spacer interface and the disk surface causing a greater than 90 degree angle between said beveled surface and said disk surface whereby lubricant emerging from the termination of said spacer interface travels along said beveled surface to said disk surface rather than being spun off the peripheral surface of said spacer assembly as droplets as a result of disk assembly rotation.

13. The magnetic disk data storage device of claim 12 wherein said beveled surface is coated with a material that is nonwettable by said lubricant.

14. The magnetic disk data storage device of claim 11 wherein a second spacer interface between spacer assembly parts extends from said annular lubricant reservoir to an inner diameter of said disk spacer which provides restricted air passage means, whereby air is permitted to enter said reservoir to replace lubricant metered from said reservoir or compensate for thermal changes.

15. The magnetic disk data storage device of claim 10 further comprising restricted air passage means extending from said lubricant reservoir to an inner diameter of said disk spacer whereby air is permitted to enter said reservoir to replace lubricant metered from said reservoir or compensate for thermal or barometric changes.

16. The magnetic disk data storage device of claim 10 wherein at a termination of the annular interface at an outer diameter of said disk spacer, the spacer peripheral surface adjoining the disk surface is beveled to provide an angle greater than 90 degrees with the disk surface, whereby lubricant metered from said interface termination does not travel along an spacer peripheral surface away from the disk.

17. The magnetic disk data storage device of claim 16 wherein said compliant annular interface surface extends to said beveled surface whereby lubricant metered from the termination of said annular interface becomes part of the lubricant film on the surface of said disk rather than being released into the atmosphere as droplets induced by disk rotation.

18. The magnetic disk data storage device of claim 9 wherein the controlled roughness comprises disk texturing at said annular interface, grooves forming the textured surface having a radial component.

19. The magnetic disk data storage device of claim 9 wherein said controlled roughness comprises a controlled roughness surface on said annular interface surface.

20. The magnetic disk data storage device of claim 9 wherein said lubricant reservoir comprises an annular cavity and said metering means comprises passage means extending radially outward from said annular cavity.

21. The magnetic disk data storage device of claim 20 wherein said passage means is treated with a coating that is nonwettable by said lubricant.

22. The magnetic disk data storage device of claim 21 further including an air passage leading from the reservoir annular cavity radially inward, said air passage being treated with a coating which is nonwettable by said liquid.

23. The magnetic disk data storage device of claim 22 further comprising an absorbent matrix material disposed in said annular cavity which retains the lubricant.

* * * * *